United States Patent [19]

Pickering

[11] 4,004,425
[45] Jan. 25, 1977

[54] TANDEM MASTER CYLINDERS FOR HYDRAULIC BRAKING SYSTEMS

[75] Inventor: John Flory Pickering, Solihull, England

[73] Assignee: Girling Limited, Birmingham, England

[22] Filed: Apr. 7, 1975

[21] Appl. No.: 565,718

[30] Foreign Application Priority Data

Apr. 19, 1974   United Kingdom ............ 17347/74

[52] U.S. Cl. .................... 60/562; 60/589; 60/590; 92/65; 92/84; 403/353
[51] Int. Cl.² ........................ B60T 11/20
[58] Field of Search ........... 60/562, 568, 585, 589, 60/590; 188/351; 403/306, 331, 353

[56] References Cited

UNITED STATES PATENTS

| 3,310,944 | 3/1967 | Bauman ............... 60/562 |
| 3,312,062 | 4/1967 | MacDuff ............ 60/562 X |
| 3,427,807 | 2/1969 | Moyes ................ 60/589 |
| 3,555,822 | 1/1971 | Rivetti ................ 60/562 |

FOREIGN PATENTS OR APPLICATIONS 693,132   8/1964   Canada ................ 60/562

Primary Examiner—William R. Cline
Assistant Examiner—Abraham Hershkovitz
Attorney, Agent, or Firm—Scrivener Parker Scrivener and Clarke

[57] ABSTRACT

In a tandem master cylinder main and secondary pistons are interconnected by a rigid sleeve. One end of the sleeve is secured to one of the pistons, and an inwardly projecting lip or flange on the other end of the sleeve provides an abutment for a head on an axial stem extending from the other piston towards the said one piston. The head is axially slidable in the sleeve and is introduced into it through an opening in the wall of the sleeve, which opening is connected by a longitudinal slot to the end of the sleeve which is provided with the lip or flange.

7 Claims, 4 Drawing Figures

FIG.1.

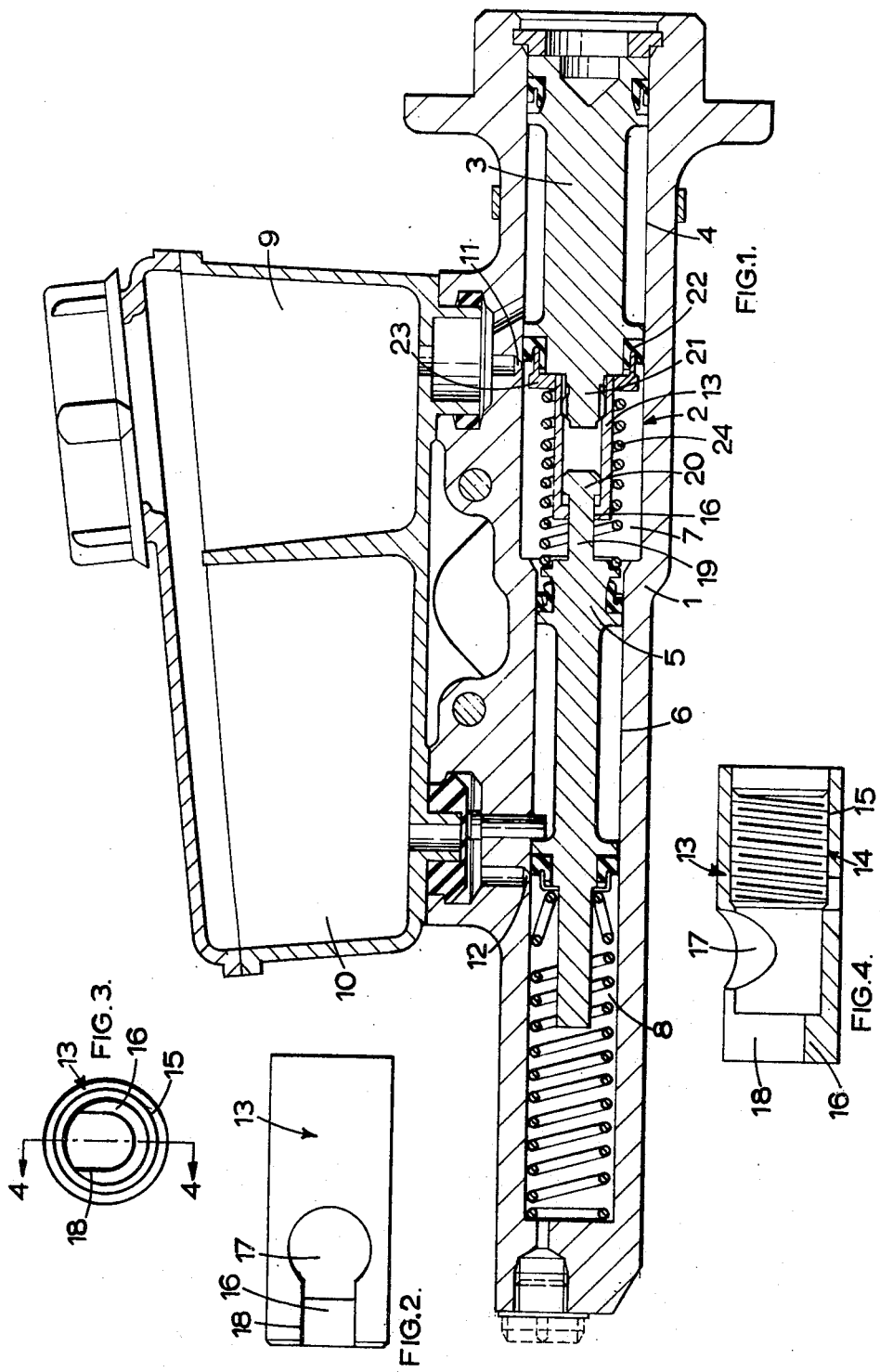

TANDEM MASTER CYLINDERS FOR HYDRAULIC BRAKING SYSTEMS

This invention relates to improvements in tandem master cylinders for hydraulic braking systems for vehicles, the master cylinders being of the kind in which a pedal-operated main piston working in one part of the cylinder bore is coupled to a secondary piston working in another part of the bore by means limiting relative axial movement between the pistons in both directions and the pistons are urged apart by a spring.

One of the objects of the present invention is to provide simple, effective and economical means for interconnecting the pistons.

According to our invention, in a tandem master cylinder of the kind set forth the main and secondary pistons are interconnected by a rigid sleeve of which one end is secured to one of the pistons, and an inwardly projecting lip or flange on the other end of the sleeve provides an abutment for a head on an axial stem extending from the other piston towards the said one piston, the head being axially slidable in the sleeve and being introduced into it through an opening in the wall of the sleeve, which opening is connected by a longitudinal slot to the end of the sleeve which is provided with the lip or flange.

Preferably the said one end of the sleeve is secured to the forward end of the main piston, and the axial stem extends rearwardly from the secondary piston.

The dimensions of the opening are sufficient to allow the head on the stem to be introduced into the sleeve with the axis of the piston provided with the stem substantially at right angles to that of the sleeve, and the slot is wide enough to provide clearance for the stem when that piston is swung round into alignment with the other piston. Relative movement between the pistons is then controlled by the head sliding in the sleeve between the abutment formed by the inwardly directed lip or flange and the forward end of the said one piston.

One example of a master cylinder embodying our invention is shown in the accompanying drawings in which:

FIG. 1 is a longitudinal section of the master cylinder;
FIG. 2 is a plan of the connecting sleeve;
FIG. 3 is an end elevation of the same; and
FIG. 4 is a longitudinal section on the line 4—4 of FIG. 3.

The master cylinder 1 shown in the drawings comprises a body 1 having a stepped bore 2. A pedal-operated main piston 3 works in the part 4 of the bore 2 which is of greater diameter and a secondary piston 5 works in the other part 6 which is of smaller diameter. The pistons respectively apply pressure to fluid in pressure spaces 7 and 8 which, in the retracted positions of the pistons, are in communications with reservoirs 9 and 10 by way of ports 11, 12 in the wall of the body 1.

The pistons 3 and 5 are coupled by a sleeve 13 shown in detail in FIGS. 2–4. The bore 14 of the sleeve has at one end an internally screw-threaded part 15 and at the other end an inwardly projecting annular lip or flange 16. An opening 17 in the wall of the sleeve 13 is connected to the second end by a longitudinal slot 18.

A stem 19 extends axially from the rear end of the secondary piston 5 and terminates in a head 20 of such diameter as to be a sliding fit in the sleeve 13 with the stem 19 being of a diameter slightly less than that of an opening defined by the lip or flange 16.

In assembling the components the first end of the sleeve 13 is screwed on an axial spigot 21 on the forward end of the piston 3. The seal 22 and the seal retainer 21 are then fitted. A primary spring 24 for urging the pistons apart is fitted over the sleeve 13 and the secondary piston 5 is held at right angles to the main piston 3 while the head 20 is inserted through the opening 17 in the sleeve, the spring 24 being held compressed against the retainer 23 to permit access to the opening 17.

The secondary piston 5 is then swung round into line with the main piston 3, the stem 19 moving through the slot 18.

The complete piston assembly can then be fitted into the cylinder bore 2.

Maximum separation of the pistons 3 and 5 is defined by the engagement of the head 20 with the inwardly directed flange 16 in the sleeve 13 and their minimum approach is defined by the engagement of the head 20 with the forward end of the spigot 21 on the main piston 3.

It is an advantage if the threaded connection between the sleeve 13 and the piston 3 is locked so that vibration cannot cause the connection to come loose. Any convenient method of locking may be used including staking, crimping, or using a thread adhesive. Preferably, the chosen locking method should not cause the sleeve to distort otherwise interference with the free passage of the spring may occur. Conveniently the sleeve 13 and the piston 3 may be locked together by deforming the thread on the spigot 21 through a small pre-formed hole in the sleeve 13.

In a modification the stem 19 and the head 20 may extend forwardly from the primary piston 3, and the sleeve 13 is screwed onto a spigot which extends axially from the rear end of the secondary piston 5.

I claim:

1. A tandem master cylinder for a vehicle hydraulic braking system, the tandem master cylinder comprising a body having a longitudinal cylinder bore, a pedal-operated main piston working in said bore, a secondary piston working in said bore in a position is advance of said main piston, coupling means coupling said pistons for limited relative axial movement in both directions, and a spring acting between said pistons to urge said pistons apart, wherein said coupling means comprise a rigid sleeve having a cylinder wall and first and second oppostie ends, said first end being secured to one of said pistons against movement relative thereto and said second end being provided with an inwardly directed flange, an axial stem extending from the other of said pistons towards the said one piston and fixed relative to the said other piston, and a head carried by said stem and axially slidable in said sleeve, said sleeve being provided in the cylinder wall thereof with an opening of substantially circular outline through which said head is introduced, and a longitudinal slot connecting said opening to said second end of said sleeve, and wherein the dimensions of said opening are sufficient to allow said head to be introduced into said sleeve with the axis of said piston provided with said stem substantially at right angles to that of said sleeve, and said slot is wide enough to provide clearance for said stem when the said last mentioned piston is swung round into alignment with the said other piston.

2. A tandem master cylinder as claimed in claim 1, wherein said first end of said sleeve is secured to said main piston, and said axial stem extends rearwardly from said secondary piston.

3. A tandem master cylinder as claimed in claim 1, wherein said first end of said sleeve is secured to said secondary piston, and said axial stem extends forwardly from said main piston.

4. A tandem master cylinder as claimed in claim 1, wherein an axial spigot having screw threads is provided on the said one piston, and said sleeve is screwed onto said spigot.

5. A tandem master cylinder as claimed in claim 4, wherein means are provided for locking said sleeve and said spigot against relative rotation.

6. A tandem master cylinder as claimed in claim 4, wherein said sleeve is provided in the cylinder wall thereof with a further opening and said threads on said spigot are deformed in the region of said further opening.

7. A tandem master cylinder as claimed in claim 1, wherein the end of the said one piston to which said sleeve is secured carries a seal for sealing engagement in said cylinder bore, and a retainer separate from said sleeve secures said seal to the said one piston, said spring acting between said retainer and the said other piston.

* * * * *